Aug. 6, 1946.   W. S. FAUST ET AL   2,405,199
FLUID PRESSURE GAUGE
Filed April 19, 1944
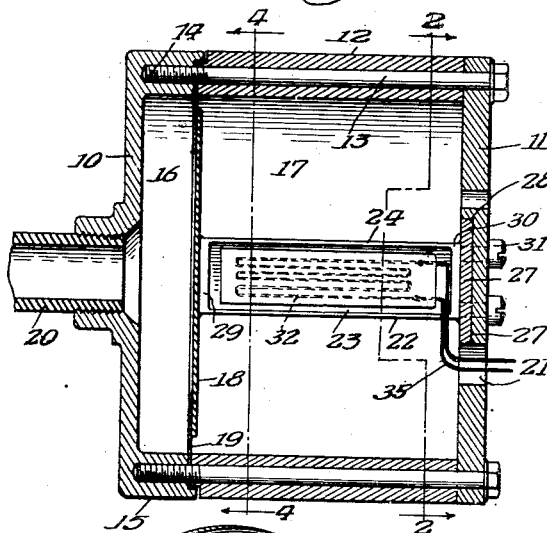
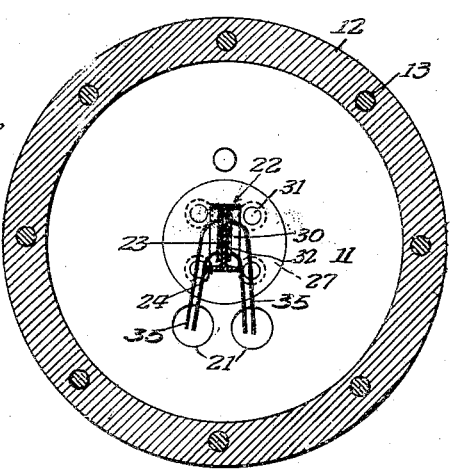
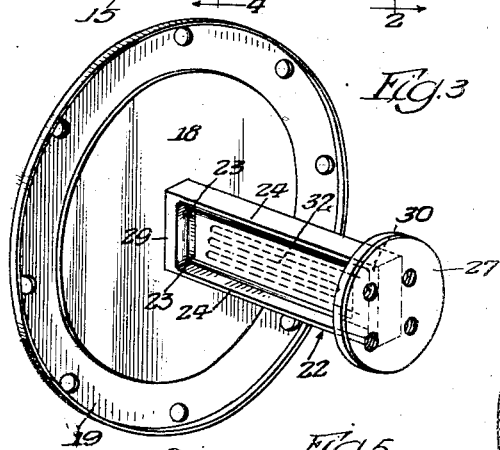
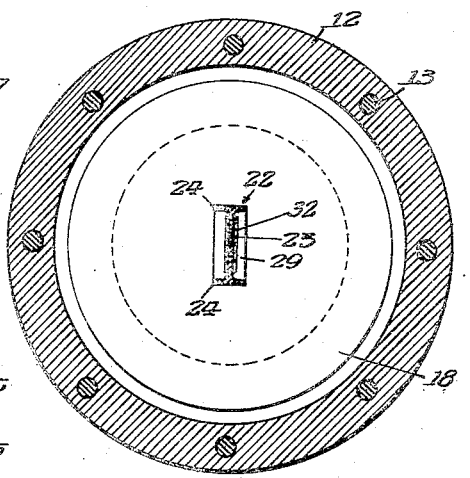
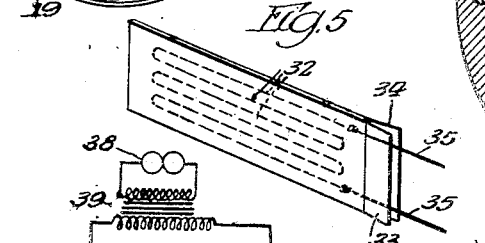
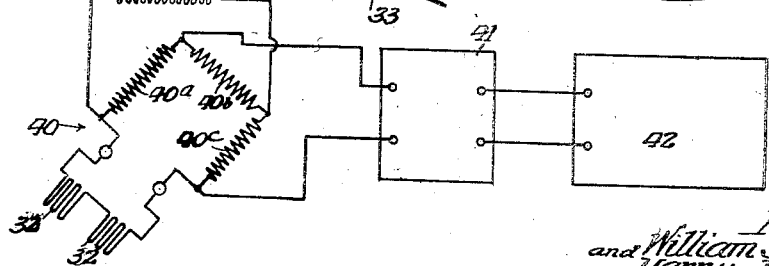
Inventors
William S. Faust
and Harry J. Lavo
by Fred Gerlach
their Atty.

Patented Aug. 6, 1946

2,405,199

UNITED STATES PATENT OFFICE 2,405,199

FLUID PRESSURE GAUGE

William S. Faust and Harry J. Lavo, Williamsport, Pa., assignors to The Aviation Corporation, New York, N. Y., a corporation of Delaware Application April 19, 1944, Serial No. 531,689

14 Claims. (Cl. 201—48)

The invention relates to fluid pressure gauges and more particularly to that type which is adapted for measuring either pressure fluctuations or static pressures, or both.

One object of the invention is to provide an improved pressure gauge which includes means responsive to fluid pressures, an electrical strain-sensitive resistance wire, and means for straining the wire responsively to the fluid pressures for controlling the actuation of a suitable indicating or recording instrument.

Another object of the invention is to provide a fluid pressure indicator of this type which is simple in construction and sensitive and efficient in operation.

Other objects of the invention will appear from the detailed description.

The invention consists in the several novel features hereinafter set forth and more particularly defined by claims at the conclusion hereof.

In the drawing:

Fig. 1 is a longitudinal section of a gauge embodying the invention.

Fig. 2 is a section taken on line 2—2 of Fig. 1.

Fig. 3 is a perspective of the piston which is responsive to variations in fluid pressure, and the strain sensitive column which is strained by the diaphragm and carries the electrical strain sensitive elements.

Fig. 4 is a section taken on line 4—4 of Fig. 1.

Fig. 5 is a perspective of one of the strain sensitive elements.

Fig. 6 is a diagram of an electric circuit including a recording instrument controlled by the strain sensitive elements.

The invention is exemplified in a casing which comprises a head or end-section 10 and an opposite end-section or head 11 and an intermediate housing section 12, which sections are secured together by bolts 13 which extend through the sections 11 and 12, and are screw-threaded at 14 into a flange 15 which is integral with the section 10. The space within the housing is divided into two chambers or compartments 16 and 17 by a pressure responsive element which is formed of a disk 18 and a ring 19. The margin of the ring is clamped between the contiguous ends of the housing-section 12 and the flange 15 of the section 10 to form a seal for the chamber between the pressure responsive element and section 10. A pipe 20 connected to receive fluid, the pressure of which is to be measured, is screw-threaded into the section 10 and is adapted to admit the fluid into the chamber 16. The chamber 16 retains the fluid under pressure for applying proportionate force to the diaphragm. Disk 18 is substantially rigid and for that purpose is formed of suitable metal, such as steel. The ring 19 is formed of thin or flexible material, such as brass shim stock, and its inner margin overlaps the outer margin of the disk 18 and is silver-soldered to said ring. The flexible ring permits the disk 18 to be moved axially of the chamber by and proportionately to the pressure of the fluid in the chamber 16. The disk 18 functions as a rigid element which is responsive to pressure in the chamber 16 for straining a sensitive column 22. The chamber 17 is open to atmosphere through holes 21 which extend through the casing-section 11.

The inner end of column 22 has a shoulder 29, the face of which is silver-soldered to the disk 18. The opposite end of column 22 has a shoulder 30, the face of which is similarly soldered to a plate 27 which fits in a recess 28 in the inner face of casing-section 11, and is fixedly secured by screws 31 to said section and in said recess. The axis of column 22 is perpendicular to the plane of disk 18. The column is formed of suitable material, such as heat treated beryllium copper, and is strained by the pressure of the fluid in the sealed chamber 16 which is applied to the disk 18 for axially loading the column. The column, between shoulders 29 and 30, is I-shaped in cross-section and comprises a flat web 23 and oppositely extending longitudinal flanges 24. These flanges resist bending of the column by the axial loads applied to the column by the disk 18. The plate 27 and its abutting engagement with the casing-section 11 in recess 28, rigidly restrain the end of the column opposite the disk, so that the column will be strained by axial loads applied thereto by the disk 18. This construction exemplifies a column between the casing-section 11 and the disk 18 to which axial forces are transmitted for straining the column proportionately to the pressure of fluid in chamber 16 through the disk 18.

An electrical strain sensitive element is cemented to each face of the web 23 symmetrically about the longitudinal axis of the column for measuring the longitudinal strain imparted to the column and for cancelling out any bending strain in the column. Such strains are imparted by the fluid pressure in the chamber 16. Each of these strain sensitive elements comprises a strip of fine strain-sensitive resistance wire 32 for example .0015" diameter, bent into a series of longitudinally extending loops and cemented between cover sheets 33 and 34. One of the cover sheets of each strain-sensitive resistance element is cemented to each side of the web 23 of the column 22. Lead conductors 35 are soldered to the ends of the resistance wire 32. The wires 32 of the strain gauges are connected in series to cumulate their changes in resistance and attain greater sensitivity. The resistance of the strain sensitive elements is proportionate to the straining of the column and the pressure of the fluid in chamber 16.

The strain sensitive elements are connected to any suitable circuit for controlling the actuation of a suitable instrument for recording or indicating the pressure of the fluid in the chamber 16 as controlled by the voltage drop across the strain gauges. In Fig. 6, the resistance wires 32 of the strain gauges are incorporated in an electric circuit which includes a source of alternating current of any desired frequency and an isolating transformer. The secondary leads of the transformer 39 are connected to an alternating current bridge circuit, generally designated 40, having resistance arms 40$^a$, 40$^b$ and 40$^c$ and having the resistance wires of the strain gauges 32 forming the fourth bridge arm. The potential drop across the wire gauges varies in accordance with the changes of the resistance therein, thereby causing a change in the potential applied to an alternating current amplifier 41 which is connected to a cathode ray or recording oscillograph 42 for recording or indicating the pressures of the fluid in the chamber 16 as measured by the change in resistance of the wires 32 cemented on the column 22.

The device described is adapted for measuring static pressure and/or pressure variations in lines containing fluid, such for example as the pressure in the supercharger system of an aircraft engine, as well as fluid in lines used for other purposes.

In operation, pressure of the fluid in the sealed chamber 16 reacts on the disk 18 and strains the column 22 proportionately to such pressures. The abutment plate 27 on the column is rigidly held longitudinally by its abutment with rigid head 11 of the casing, so that the axial pressure applied to the disk 16 strains the column 22 proportionately to the instantaneous pressure of the fluid in the line to which the pressure gauge is applied.

The invention exemplifies a pressure gauge which includes a strain-sensitive column which is strained responsively to pressure of the fluid and carries one or more electric strain sensitive resistance elements for controlling the electric circuit for the actuation of a recording or indicating instrument. This gauge is simple in construction, and sensitive and efficient in its operation. The gauge can be readily applied to any line containing a fluid and is well adapted for measuring static and/or dynamic fluid pressures.

The invention is not to be understood as restricted to the details set forth, since these may be modified within the scope of the appended claims without departing from the spirit and scope of the invention.

Having thus described the invention, what we claim as new and desire to secure by Letters Patent is:

1. A fluid pressure gauge comprising a casing provided at one of its ends with a chamber and means for admitting to said chamber fluid, the pressure of which is to be measured; a strain-sensitive column; a rigid abutment for one end of said column; a pressure responsive element in the casing exposed to the pressure of the fluid in the chamber and axially loading the other end of the column, for straining the column responsively to instantaneous fluid pressures in the chamber; and electrical strain sensitive filaments having loops extending longitudinally of and fixed on the column for controlling an electrical circuit responsively to the strains imparted to the column.

2. A fluid pressure gauge comprising a casing provided at one of its ends with a chamber and means for admitting to said chamber fluid, the pressure of which is to be measured; a strain-sensitive column; a rigid abutment for one end of said column having substantially flat sides; a pressure responsive element in the casing exposed to the pressure of fluid in the chamber and axially loading the other end of the column, for straining the column responsively to fluctuations of the fluid pressure in the chamber; and a pair of series-connected electric strain sensitive filaments fixed on the sides of the column, for controlling an electrical circuit responsively to the pressure fluctuations in the chamber.

3. A fluid pressure gauge comprising a casing provided at one of its ends with a chamber and means for admitting to said chamber fluid, the pressure of which is to be measured; a strain-sensitive column having a substantially flat side portion; the casing being provided with an extension for enclosing, and a rigid abutment for one end of, said column; a pressure responsive element in the casing exposed to the pressure of the fluid in the chamber and axially loading the other end of the column, for straining the column responsively to fluctuations of the fluid pressure in the chamber; and an electric strain sensitive filament fixed on the flat side portion of the column for controlling an electrical circuit responsively to the pressure fluctuations in the chamber.

4. A fluid pressure gauge comprising a casing provided at one of its ends with a chamber and means for admitting to said chamber fluid, the pressure of which is to be measured; a strain-sensitive column; the casing being provided with an enclosing member around the column and at its opposite end with a rigid abutment for one end of said column; a pressure responsive element in the casing exposed to the pressure of fluid in the chamber, and axially loading the other end of the column for straining the column responsively to fluctuations of the fluid pressure in the chamber; and an electric strain sensitive filament fixed on the column and including longitudinally extending loops for controlling an electrical circuit responsively to the pressure fluctuations in the chamber.

5. A fluid pressure gauge comprising a casing provided at one of its ends with a chamber and means for admitting to said chamber fluid, the pressure of which is to be measured; a strain-sensitive column provided with an axially extending web and longitudinal flanges for restraining bending; a rigid abutment for one end of said column; a pressure responsive element in the casing exposed to the pressure of the fluid in the chamber and axially loading the other end of the column, for straining the column responsively to instantaneous fluid pressures in the chamber; and an electric strain sensitive filament fixed on the column for controlling an electrical circuit responsively to the strains imparted to the column.

6. A fluid pressure gauge comprising a casing provided at one of its ends with a chamber and means for admitting to said chamber fluid, the pressure of which is to be measured; a strain-sensitive column provided with an axially extending web, shoulders at its ends, and longitudinal flanges projecting from both sides of the web, for restraining bending, a rigid abutment for one end of said column; a pressure responsive element in the casing exposed to the pressure of the fluid in the chamber and axially loading the other end of the column, for straining the column responsively to fluctuations of the fluid pressure in the chamber; and an electric strain sensitive filament on the column for controlling an electrical circuit responsively to the pressure fluctuations in the chamber.

7. A fluid pressure gauge comprising a casing provided at one of its ends with a chamber, and means for admitting to the chamber fluid, the pressure of which is to be measured; a pressure responsive element comprising a rigid central disk and a flexible marginal member, joined together to form one side of, and exposed to pressure of the fluid in, said chamber; a rigid abutment on the other end of the casing; a strain-sensitive column restrained at one of its ends by said abutment, and axially loaded on its other end by the disk, for straining the column responsively to pressure fluctuations in the chamber; and an electric strain sensitive filament fixed on the column and including portions extending substantially parallel of the access of the abutment for controlling an electric circuit responsively to the pressure fluctuations in the chamber.

8. A fluid pressure gauge comprising a casing provided at one of its ends with a chamber and means for admitting to the chamber fluid, the pressure of which is to be measured; a pressure responsive element comprising a rigid central disk and a flexible ring joined together to form one side of and exposed to pressure of the fluid in said chamber; a rigid abutment on the casing and having substantially flat sides; a strain-sensitive column restrained at one of its ends by said abutment and at its other end axially loaded by and joined to the disk, for straining the column responsively to pressure fluctuations in the chamber; and an electric strain sensitive filament fixed on the column and having loops substantially coplanar with the sides for controlling an electric circuit responsively to the pressure fluctuations in the chamber.

9. A fluid pressure gauge comprising a casing provided at one of its ends with a chamber and means for admitting to the chamber fluid, the pressure of which is to be measured; a pressure responsive element comprising a rigid central disk and a flexible ring joined together to form one side of and exposed to pressure of the fluid in said chamber; a rigid abutment on the casing; a strain-sensitive column having a plate on one of its ends engaging said abutment, having a substantially flat side and having its other end secured to and axially loaded by the disk, for straining the column responsively to pressure fluctuations in the chamber; and an electric strain sensitive filament fixed on the flat side of the column for controlling an electric circuit responsively to the pressure fluctuations in the chamber.

10. A fluid pressure gauge comprising a casing provided at one of its ends with a chamber and means for admitting to the chamber fluid, the pressure of which is to be measured; a pressure responsive element comprising a rigid central disk and a flexible marginal member joined together to form one side of and exposed to pressure of the fluid in said chamber; the casing being provided with a recess forming a rigid abutment; a strain-sensitive column having a plate fitting in said recess and restrained by said abutment, and having its other end secured to, and axially loaded by, the disk, for straining the column responsively to pressure fluctuations in the chamber; and an electric strain sensitive filament fixed on the column for controlling an electric circuit responsively to the pressure fluctuations in the chamber.

11. A fluid pressure gauge comprising a casing which includes an end-section provided with a chamber and means for admitting to the chamber fluid, the pressure of which is to be measured, an opposite end-section provided with a rigid abutment, and an intermediate housing section; a pressure responsive element forming one side of the chamber and including a rigid central disk and a flexible ring jointed to the disk and having its margin clamped between the housing-section and the casing-section provided with the chamber; a strain-sensitive column extending across and housed by the intermediate section, axially loaded at one end by the disk, and engaging the abutment at its other end, for straining the column responsively to the fluctuations of the pressure of the fluid against the piston, and an electric strain sensitive filament fixed on the column, for controlling an electric circuit responsively to the pressure fluctuations in the chamber.

12. A fluid pressure gauge comprising a casing which includes an end section provided with a chamber and means for admitting to the chamber fluid, the pressure of which is to be measured, an opposite end section provided with a rigid abutment, and an intermediate housing-section; a pressure responsive element forming one side of the chamber and including a rigid central disk and a flexible ring joined to the disk and having its margin clamped between the housing-section and the casing-section provided with the chamber; a strain-sensitive column extending across and in the housing-section, provided with a shoulder at one end rigidly secured to, and axially loaded by the disk, and an enlarged shoulder at its other end restrained by the abutment in the end-section, for straining the column responsively to the fluctuations of the pressure of the fluid against the piston, and an electric strain sensitive filament fixed on the column, for controlling the electric circuit responsively to the pressure fluctuations in the chamber.

13. A fluid pressure gauge comprising a casing which includes an end-section provided with a chamber and means for admitting to the chamber fluid, the pressure of which is to be measured, an opposite end-section provided with a rigid abutment, and an intermediate housing-section; a pressure responsive element forming one side of the chamber and including a rigid central disk and a flexible ring joined to the disk and having its margins clamped between the housing-section and the casing-section provided with the chamber; a strain-sensitive column extending across and in the housing-section, and provided with an enlarged shoulder at one end rigidly joined to and axially loaded by the disk, and a shoulder at its other end having secured thereto a plate for engaging the abutment in the end-section, for straining the column responsively to the fluctuations of the pressure of the fluid against the piston, and an electric strain sensitive filament fixed on the column, for controlling the electric circuit responsively to the pressure fluctuations in the chamber.

14. A fluid pressure gauge comprising a casing which includes an end section provided with a chamber and means for admitting to the chamber fluid, the pressure of which is to be measured, an opposite end-section provided with a rigid abutment, and an intermediate housing-section, a pressure responsive element forming one side of the chamber and including a rigid central disk and a flexible ring joined to the disk and having its margins clamped between the housing-section and the casing-section provided with the chamber; a strain-sensitive column extending across and housed by the intermediate section, and provided with a web, a shoulder at one end rigidly joined to and axially loaded by the disk, and a shoulder at its other end having secured thereto a plate for engaging the abutment in the end-section, for straining the column responsively to the fluctuations of the pressure of the fluid against the piston and provided with flanges for restraining torsional bending of the column; and an electric strain sensitive filament fixed on the column for controlling the electric circuit responsively to the pressure fluctuations in the chamber.

WILLIAM S. FAUST.
HARRY J. LAVO.